INVENTORS
ELMER L. HAYMAN
ROBERT E. McCUTCHAN
MICHAEL L. MARCOUX
BY
-AGENT

May 14, 1968     E. L. HAYMAN ET AL     3,382,708
FATIGUE TEST MACHINE STROKE ARRESTOR
Filed March 2, 1966     3 Sheets-Sheet 3
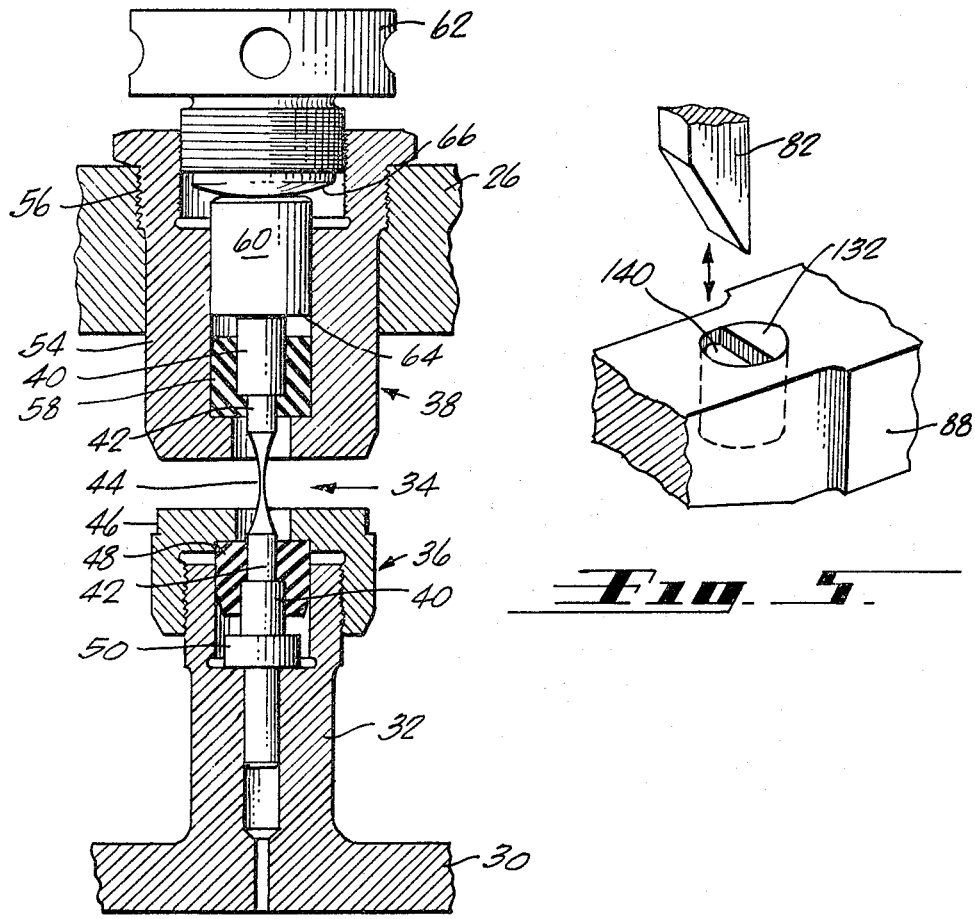
INVENTORS
ELMER L. HAYMAN
ROBERT E McCUTCHAN
MICHAEL L. MARCOUX
BY
-AGENT-

United States Patent Office 3,382,708
Patented May 14, 1968

3,382,708
FATIGUE TEST MACHINE STROKE ARRESTOR
Elmer L. Hayman, Downey, Michael L. Marcoux, Huntington Beach, and Robert E. McCutchan, Lakewood, Calif., assignors, by mesne assignments, to McDonnell Douglas Corporation, Santa Monica, Calif., a corporation of Maryland
Filed Mar. 2, 1966, Ser. No. 531,270
9 Claims. (Cl. 73—91)

ABSTRACT OF THE DISCLOSURE

An arresting apparatus to be employed in conjunction with the movable drive element of a fatigue testing machine wherein the arrestor includes a spring-biased plunger which is extended to prevent the inertial cyclic movement of the drive element in the interval of time encompassed by one half a cycle.

---

This invention relates to movement arresting devices and more particularly to devices employed in conjunction with reciprocating apparatus to arrest reciprocating movement when certain conditions are encountered.

One use of such a device is in conjunction with an axial fatigue testing machine. Such machines are in common use and are normally intended to produce an axial and/or compressive force on the testing specimens to induce failure thereof. Such force produces slight specimen movement due to its elastic deflection. Machines of this type are normally provided with a table portion with a crosshead fixed thereto. An aperture is located within the center of the table and a movable element is positioned therein. A specimen to be tested is located between the movable element and fixed crosshead. An adjustable eccentric weight is coupled to the movable element and arranged in a manner as only to permit axial movement, i.e., eliminating all transverse movement. The weight is rotated at a constant speed to regulate movement of the movable element. Adjustment of the eccentric weight will vary the force applied to the specimen and also the extent of the axial movement. A typical example of such a machine permits a complete reciprocating cycle in 32 milliseconds. The applied force may be varied from zero to 10,000 pounds with movement or specimen deflection in the order of .010″.

Upon failure of the specimen, it is desirable to prevent instantaneously further movement of the movable element. No means has been provided in prior known machines by which further inertial movement could be prevented. If the movement continues after a specimen failure, the broken sections of the specimen will impact thereby damaging each section. It is desirable to examine the specimen sections to determine the cause of the failure, whether the failure started from the outside or inside, the grain structure involved and the particular type of failure. If the sections of the specimen are permitted to impact, the resulting damage prevents such an examination.

Also, much time is spent in aligning the fixed crosshead and movable element which support the specimen therebetween. For accurate testing purposes a misalignment of .001″ is the maximum allowable. Such an accurate alignment is necessary for accurate testing results. When a specimen is imperfectly aligned, a greater than average load is imposed on the external portion of the specimen. This, in effect, is the same as testing at a higher average load with accurate alignment.

A common means for increasing accuracy of alignment is to employ long specimens, (two to three feet and longer in length) thereby reducing misalignment angle, i.e., .25 inch misalignment over a two to three foot specimen is relatively negligible where as compared to a four to six inch specimen .25 inch is a substantial misalignment. However, lengthy specimens are undesirable because longer specimens increase cost for the specimen material, a lengthy specimen is more likely to contain machined imperfections which would cause a premature failure, and, the economic considerations in the handling time increases in the preparation for testing and in the aligning of the specimen in the testing mechanism. It is desirable to employ a specimen of a shorter length (approximately 4 inches) and to align the specimen with great accuracy in the testing machine. To achieve such accuracy, the specimen holder has been tooled with a high degree of precision and designed to facilitate extreme ease in installation of the specimen and the specimen holder in the testing machine.

However, if the sections of the specimen after failure are permitted to impact, the alignment of the crosshead and element is disturbed, thereby necessitating realignment for the next test. Such a realignment procedure usually occupies several hours, thereby being expensive and further proving impractical the cost of the precision tooling of the specimen holder. The device of this invention prevents such impaction, thereby not disturbing the alignment.

The apparatus of this invention overcomes the heretofore described difficulties. Briefly, this invention relates to a spring biased plunger which is activated upon a specimen failure to react within a time in the order of 16 milliseconds, releasing the plunger, to contact the movable element and prevent further reciprocating movement. The device must operate within 16 milliseconds as that is the time-span for one-half a cycle which is the amount of reciprocation of the movable element, upon specimen failure, before impact between the specimen sections. The amount of time consumed in the operation of the device is not definitely known; however, the activation of the device is well within the 16 milliseconds allotted.

Other objects and features of the invention will become apparent as the description proceeds, particularly when taken in conjunction with the accompanying drawings illustrating the invention wherein:

FIG. 4 is a detail sectional view of a precision specimen alignment arrangement; and FIG. 5 is an enlarged fragmentary perspective view of an area identicated at 5 in FIG. 2 and showing the specific plunger release means.

Figure 1:
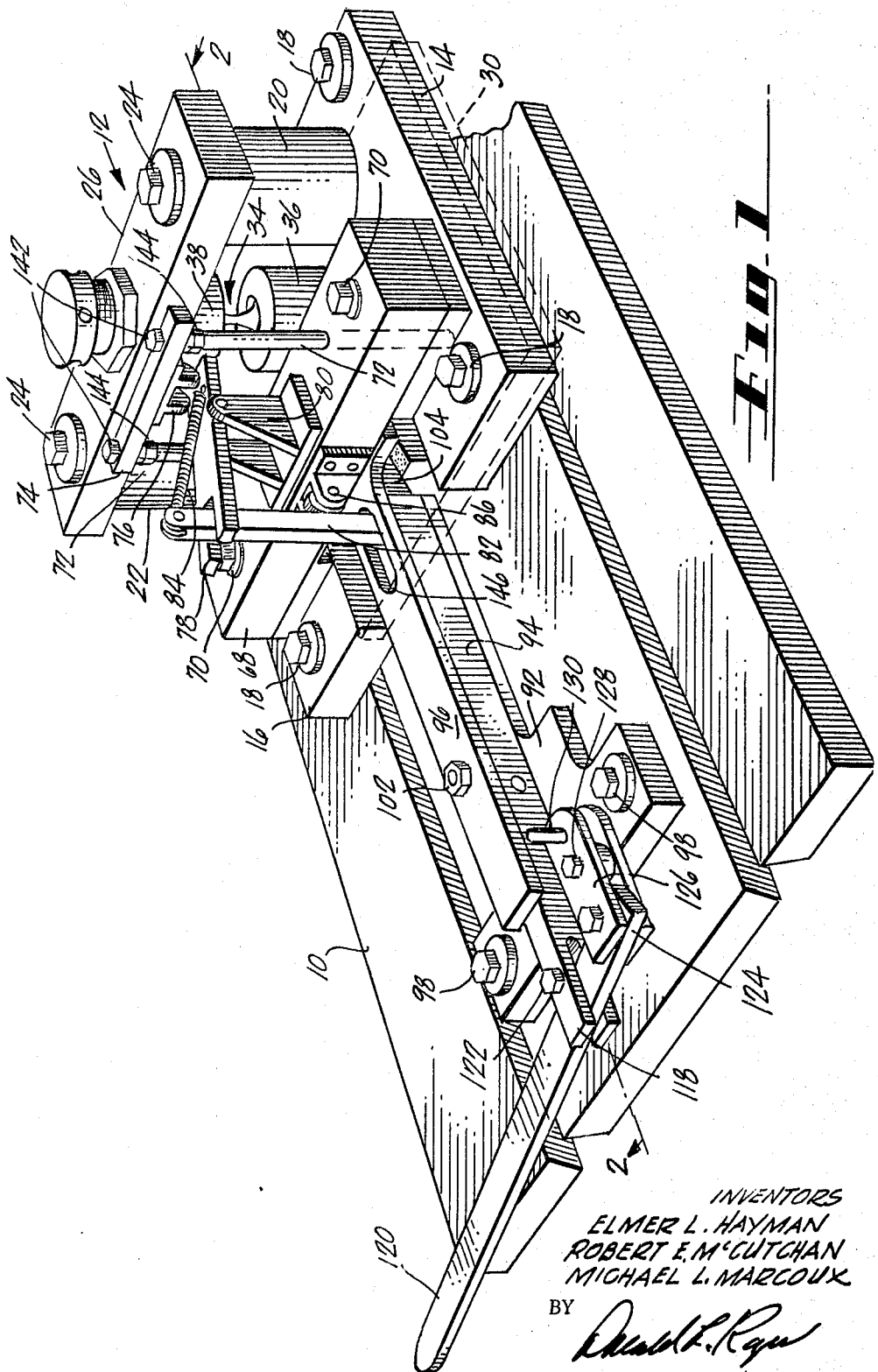
FIGURE 1 is a pictorial view of the device of this invention as mounted on a fatigue testing machine.

With reference to the drawings and specifically to FIG. 1 thereof, the testing apparatus with which the present invention may be used includes a base 10 which comprises a fixed table section of a typical axial fatigue testing machine. A fixed crosshead arrangement 12 is mounted on the base 10. Crosshead 12 includes foot portions 14 and 16 rigidly secured to the base 10 by means of bolts 18. Securely mounted on the foot portions 14 and 16 are cylindrical sections 20 and 22, respectively, connected thereto by bolts 24. Crossbar 26 is mounted atop each cylindrical section 20 and 22, bridged therebetween, and securely connected thereto by bolts 24. Each element of the crosshead arrangement 12 is machined with great accuracy. It is absolutely necessary for accurate testing that crossbar 26 be mounted exactly parallel to the plane of base 10. To accomplish such precision, each surface of members 14, 16, 20, 22 and 26 is precisionly ground to insure that all contacting surfaces are exactly planar and that each contacting surface makes an angle of 90° with each other. It is known that to do such "exactly" is impossible, however, any errors are held to such a minimum that, for all practical purposes, it can be said to be exact.

Base 10 contains an aperture 28 within which movable stand 30 having an upstanding column 32 reciprocates. An adjustable eccentric weight is located on the underside of the movable stand 30 (not shown) and arranged in such a manner as to permit axial movement to a maximum of ±.250 inch. Testing specimen 34 is securely mounted between upstanding column 32 and crossbar 26 by means of connectors 36 and 38, respectively. Specimen 34 is designed with cylindrically shaped ends 40, slightly smaller adjacent cylindrical sections 42 and a narrowing center section 44. Specimen 34 is machined to a high degree of precision to insure that the dimensions of the specimens are exact as possible.

Connector 36 comprises an outer cap 46 and an inner aligning plug 48. One end 40 of specimen 34 abuts aligning bolt 50 fastened within upstanding column 32. Aligning plug 48 is composed of two half-sections. Each half-section is positioned about cylindrical sections 40 and 42 and are so constructed to establish a snug fitting relationship. Cap 46 is placed to contact plug 48, and by means of a screw connection 52 between cap 46 and upstanding column 32, cap 46 is tightened thereby securely holding end 40 of the specimen in place.

Connector 38 operates similarly to connector 36 to hold securely in place the other end 40 of the specimen. Connector 38 comprises a cap 54 which is threadably fastened at 56 to crossbar 26. A two half-section plug 58 is supported within cap 54 which in turn supports the specimen 34 similarly to plug 48. A block 60 is positioned within cap 54, block 60 being contacted on each end by specimen end 40 and bolt 62. Bolt 62 is threadably supported within cap 54 and, by tightening bolt 62, block 60 reacts on end 40 of specimen 34 thereby firmly maintaining the specimen in place. As shown in FIG. 4 bolt 62 is convexly shaped at end 66 which contacts block 60. It has been found that the convex-planar type of connection establishes a more accurate alignment than the common mating types of connection and also, prevents the application of torsion from bolt 62 to the specimen.

Each element of the connectors 36 and 38 is precision machined to insure accurate alignment. However, a vertical alignment within .001" is desired, and an alignment of that degree of accuracy is not possible strictly by the precision machining. Therefore, an alignment gage (not shown) may be employed and, by physically moving crossbar 26 with respect to stand 30 in minute increments, the required accurate alignment is attained.

The specimen is installed between crossbar 26 and movable stand 30 as follows. Caps 46 and 54 and their respective corresponding plugs 48 and 58 are placed in position about the specimen 34. Cap 46 is of such dimensions as to pass easily through the aperture normally occupied by cap 54. Cap 54 is then tightened in place followed by the tightening of cap 46. The specimen is then physically aligned to within .001" of perfect axial alignment. Finally, bolt 62 is tightened thereby completing specimen installation and alignment.

Although an explanation of the specimen alignment is not necessary to the direct discussion of this invention, such an explanation supplies background information as to the difficulties encountered in alignment, this invention eliminating such difficulties.

Figure 2:
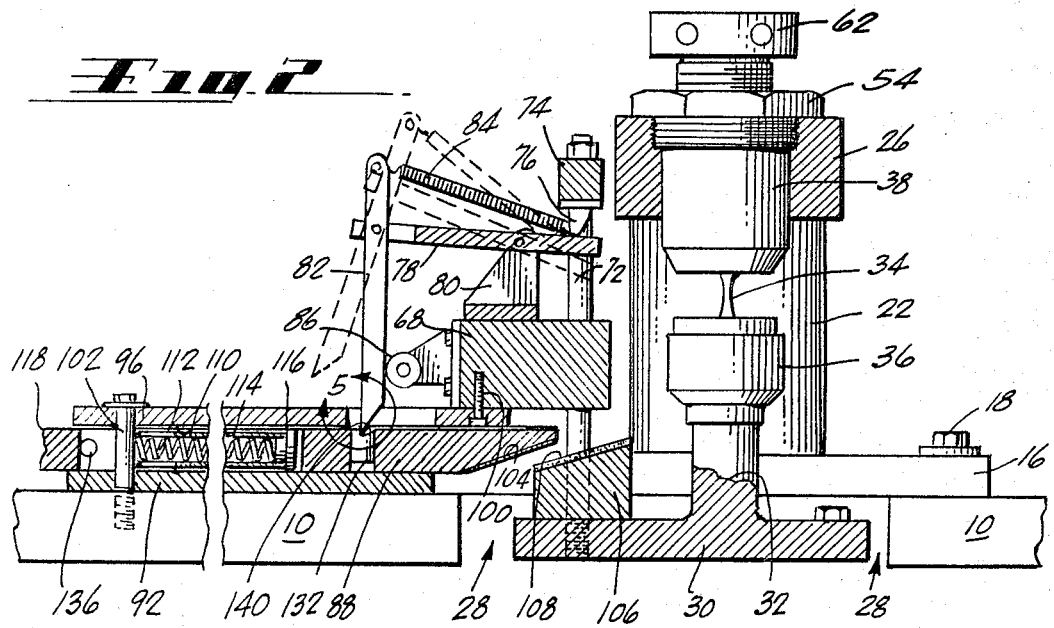
FIG. 2 is a sectional view taken substantially along line 2—2 of FIG. 1.
Figure 3:
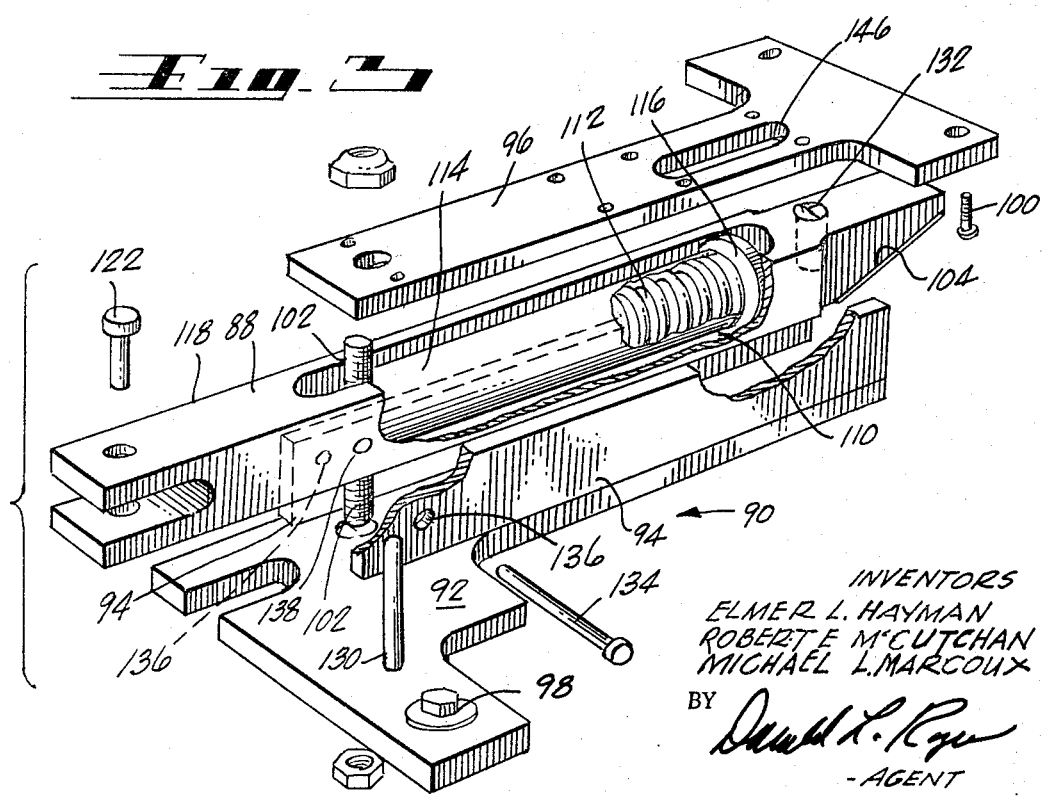
FIG. 3 is an exploded fragmentary perspective view of spring operated plunger and a housing arrangement therefor.

Defining the apparatus of this invention more specifically, with particularity, refer to FIGS. 1, 2 and 3. A crossarm 68 bridges the foot portions 14 and 16 and is mounted substantially parallel to crossbar 26. Crossarm 68 is secured to foot portions 14 and 16 by means of bolts 70. It is important that crossarm 68 bridge across a portion of the movable stand 30, as shown in the drawings. Two bolts 72 are connected at one end to the movable stand 30 and pass through corresponding apertures located in crossarm 68 and are capable of longitudinal sliding movement with respect to crossarm 68. The other end of the bolts 72 are fixed to bar 74 which includes a cam means 76 on its underside. Cam means 76 is adapted to contact the inner end of actuator 78 which is pivotally connected intermediate its length to fulcrum 80 mounted on crossarm 68. It is important that the cam means 76 be slightly (approximately .010") spaced from actuator 78 for operation, such spacing is accomplished through the double nut arrangement 142 and 144. Pivotally connected to the outer end of actuator 78 is latching arm 82. Latching arm 82 is pivotally connected to actuator 78 intermediate its ends, its upper end being connected to a spring 84 which is fixed to the inner end of actuator 78. The lower end of latching arm 82 is pointed for reasons which will be explained further in the specification. A roller bearing 86 is fixed to crossarm 68 and adapted to contact latching arm 82 adjacent its lower end to prevent forward transverse movement and to also allow ease of longitudinal movement of latching arm 82.

The lower pointed end of latching arm 82 is adapted to prevent longitudinal movement of a plunger 88. Plunger 88 is mounted adjacent base 10 and substantially parallel thereto. Noting particularly FIG. 3, plunger 88 is slidably mounted within a rectangular housing 90 formed of a base plate 92, side plates 94 and top plate 96. Base plate 92 is fastened to base 10 by means of bolts 98. Side plates 94 are bolted to the base plate 92. Top plate 96 is mounted to the crossarm 68 as by bolts 100 and attached to side plates 94 by means of bolt 102. Bolt 102 extends through plunger 88, base plate 92 and is affixed therebetween. It is to be understood from the foregoing that the apparatus is constructed so that the upper surface of the top plate 96 and the undersurface of crossarm 68 flushly contact to permit ease of fastening.

Plunger 88 is specially constructed to operate within a few thousandths of a second. To facilitate speed, plunger 88 is constructed of a light weight rugged material, one such material being aluminum. The front end 104 of plunger 88 is beveled about 20° to the horizontal. End 104, when the plunger is operated, will move longitudinally and contact a corresponding beveled block 106 securely mounted on movable stand 30. It has been found desirable to place a tough, resilient non-metallic high-cofficient of friction material on one of the beveled surfaces to avoid excessive shock. The material commonly used as a lining in vehicle braking systems has been found to be satisfactory. In the drawings, a layer 108 of such material being located on beveled block 106.

Intermediate the ends of plunger 88, a portion of the plunger has been removed leaving cavity 110. Bolt 102 passes through cavity 110 adjacent the cavity end farthest from front end 104. A resilient means such as spring 112 is contained by tube 114. Tube 114 is open and the opposite end contains a plug 116. Spring 112 reacts between bolt 102 and the end of the cavity 110 nearest front end 104. The back end 118 of plunger 88 is formed into a U-shape. Lever 120 is pivotally mounted within the apex of the U-shaped end 118 by means of pivot pin 122. Inner end 124 of lever 120 is pivotally connected to an upper and lower plate arrangement 126. The plate arrangement 126 is fastened together by means of bolt 128 and pivotally supported on base plate 92 by means of pin 130. Lever 120 is of sufficient length to acquire a mechanical advantage of approximately four to one against plunger 88. Lever 120 is needed to move plunger 88 against the action of spring 112 and place plunger 88 in the "cocked" position. Spring 112 operates with a force of approximately 200 pounds which requires the use of a 50 pound force by the lever 120 to retract plunger 88.

To lock the plunger in the cocked position a temporary safety pin 134 is employed. Pin 134 is placed through the apertures 136 inside plate 94 and into hole 138 in plunger 88. Hole 138 is to be properly aligned with apertures 136 only when the plunger is retracted by lever 120. Once the plunger is placed in the cocked position and temporarily held by pin 134, latching arm 82 is to be employed. An offset plug 132 forming strike 140 is positioned in plunger 88 and adapted to cooperate with the pointed end of latching arm 82, reference being made to the detail in FIG. 5. Latching arm 82 is to be pivoted against the action of spring 84 from the inoperative position shown by the dotted lines in FIG. 2, to a position abutting bearing 86 with the pointed end of latching arm 82 resting in strike 140 of plug 132. Pin 134 is removed leaving only latching arm 82 from preventing action of plunger 88. An opening 146 is provided in top plate 96 to allow for insertion of latching arm 82.

The precise operation of the apparatus of this invention will now be explained in detail. Once the testing specimen 34 is installed and aligned in connectors 36 and 38, plunger 88 is cocked by compressing spring 112 through the pivoting of lever 120, locking the plunger in the coked position by placing pin 134 in the aligned apertures 136 and 138. Latching arm 82 is then pivoted from its inoperative position to the position shown in FIG. 2 preventing action of plunger 88. Pin 134 is thereby withdrawn. Cam means 76 is adjusted to a position about .010″ from actuator 78 by means of the double nut arrangement 142 and 144. This is an important feature to correct operation, as the cam means 76, being directly connected to movable stand 30, will reciprocate ±.010″, therefore, cam means 76 during normal operation of the testing machine will not contact actuator 78. It is only necessary to just have a slight downward movement of the inner end of actuator 78 to remove latching arm 82 from strike 140.

Upon a specimen failure, movable stand 30 will move downwardly a distance much greater than the normal distance of .010″ (usually about 20 times as great, .200″). As a result cam means 76 will contact actuator 78, removing latching arm 82 from strike 140. Spring means 84 aids in the quick removal of latching arm 82 by pivoting the pointed end of the arm up and away from strike 140. Plunger 88 under action of the compressed spring 112 is forced to move toward movable stand 30 to contact beveled block 102 through the resilient material 108. The time evolved for the removing of latching arm 82 and the moving of the plunger 88 to contact material 108 has to be within the time allowed for the movement of the stand 30 for one-half a cycle after the failure of the specimen. Thereupon, plunger 88 will eliminate further upward movement of the stand 30 and prevent the impacting of the broken sections of the specimen.

Having thus described the invention in relation to an axial fatigue testing machine, it is to be understood that the invention should in no way be limited thereto, but is applicable in other environments wherein an arrestation of oscillating or reciprocating movement is desired.

We claim:

1. A device to arrest the inertial movement of a reciprocating drive element of a fatigue tester comprising:
   a plunger having a front end and a rear end;
   a first spring means operating said plunger;
   a housing for supporting said plunger, said plunger being movable within said housing, said housing being fixed with respect to said plunger, said first spring means operating between said housing and said plunger;
   spring compressing means connected to said plunger to move said plunger thereby compressing said first spring means;
   latching means connectable to said plunger to prevent plunger movement by said first spring means, said latching means being connected to an actuator; and
   said reciprocating drive element, said element moving in a direction which is substantially perpendicular to the direction of plunger movement, said element being movable within a primarily established range of values having an upper and lower limit, said element upon exceeding said lower limit actuates said actuator, releasing said latching means and causing said plunger to extend and engage said movable element whereby to stop said movable element and prevent said element from equaling and exceeding said upper limit.

2. An apparatus as defined in claim 1 wherein:
   said spring operated plunger being beveled at its front end, said beveled front end being adapted to contact said movable element and prevent further reciprocating movement, said movable element including a corresponding bevel to contact said beveled front end of said plunger.

3. An apparatus as defined in claim 2 including:
   a primarily non-metallic, high-coefficient of friction material established between said contact of said plunger and said movable element to prevent excess wear and to absorb shock.

4. An apparatus as defined in claim 1 wherein:
   said spring compressing means is connected to said rear end of said plunger, said spring compressing means comprising a pivoted lever arrangement whereby said plunger is easily moved against the action of said first spring means.

5. An apparatus as defined in claim 1 wherein:
   said first spring means being wholly contained within said plunger intermediate said front and rear ends of said plunger.

6. An apparatus as defined in claim 1 wherein:
   said latching means, upon actuation of said actuator, is assisted for quick disconnection from said plunger by a second spring means.

7. In an axial fatigue testing apparatus comprising:
   a fixed base, a reciprocating movable base, a crosshead mounted a spaced axial distance from said movable base and being fixedly mounted on said fixed base, a specimen of material to be tested being axially aligned and fixedly mounted between said movable base and said crosshead, the improvement comprising:
      a plunger having a front end and a rear end;
      a first spring means operating said plunger;
      an open-ended housing for supporting said plunger in a longitudinally movable relationship, said housing being fixedly secured to said fixed base, said first spring means operating between said housing and said plunger;
      spring compressing means connected to said plunger to move said plunger thereby compressing said first spring means;
      latching means connectable to said plunger to prevent plunger movement by said first spring means, said holding means being connected to an actuator; and
      said reciprocating movable base moving in a direction which is substantially perpendicular to the direction of plunger movement, said movement being primarily reciprocal within an established range of values having an upper and lower limit, said movable base upon exceeding said lower limit actuates said actuator, releasing said latching means and causing said plunger to extend and prevent said movable base from equaling and exceeding said upper limit.

8. In an axial fatigue testing apparatus as defined in claim 7 wherein:
   said first spring means being wholly contained within said plunger intermediate said front and rear ends of said plunger.

9. In a machine for fatigue testing of specimens having a reciprocating drive element for subjecting the specimens to cyclic stress variations, the improvement comprising:
a plunger;
a spring means operating said plunger;
a fixed housing for containing said plunger longitudinally movable therein;
latching means connectable to said plunger to prevent plunger movement by said spring means, said latching means being unconnected from said plunger by excessive movement of said reciprocating drive element causing said spring means to extend said plunger to engage said reciprocating element and prevent further reciprocating movement.

References Cited

UNITED STATES PATENTS

| | | | |
|---|---|---|---|
| 2,589,395 | 3/1952 | Kanard | 74—2 X |
| 2,222,325 | 11/1940 | Wachsman | 74—2 X |
| 2,536,336 | 1/1951 | Watson | 74—2 X |
| 2,681,656 | 6/1954 | Starkenberg | 74—2 X |
| 2,626,563 | 1/1953 | Banthin | 74—2 X |
| 3,089,929 | 5/1963 | Murphy | 74—2 X |
| 3,140,721 | 7/1964 | Sullivan | 74—2 X |
| 3,135,106 | 6/1964 | Lazan | 73—15.6 |

RICHARD C. QUEISSER, *Primary Examiner.*

JAMES H. WILLIAMSON, *Assistant Examiner.*